(12) United States Patent
Li et al.

(10) Patent No.: US 10,720,187 B2
(45) Date of Patent: Jul. 21, 2020

(54) METHOD AND APPARATUS TO EXTRACT KEY VIDEO FRAMES FROM ONLINE EDUCATION

(71) Applicant: International Business Machines Corporation, Armonk, NY (US)

(72) Inventors: Feng Li, Beijing (CN); Qi Cheng Li, Beijing (CN); Li Jun Mei, Beijing (CN); Xin Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 813 days.

(21) Appl. No.: 14/869,320

(22) Filed: Sep. 29, 2015

(65) Prior Publication Data
US 2017/0092333 A1  Mar. 30, 2017

(51) Int. Cl.
| H04N 5/77 | (2006.01) |
| G11B 27/22 | (2006.01) |
| G11B 27/34 | (2006.01) |
| G11B 27/06 | (2006.01) |
| G09B 5/02 | (2006.01) |
| G06K 9/00 | (2006.01) |

(52) U.S. Cl.
CPC ......... *G11B 27/22* (2013.01); *G06K 9/00744* (2013.01); *G09B 5/02* (2013.01); *G11B 27/06* (2013.01); *G11B 27/34* (2013.01)

(58) Field of Classification Search
CPC .................................................. G11B 27/22
USPC ......................................................... 386/228
See application file for complete search history.

(56) References Cited

U.S. PATENT DOCUMENTS

| 8,086,071 B2 | 12/2011 | Chen et al. | |
| 8,733,951 B2 | 5/2014 | Gruen et al. | |
| 2006/0230332 A1* | 10/2006 | Lin | G09B 5/06 715/203 |
| 2012/0062594 A1* | 3/2012 | Campbell | G06F 3/005 345/632 |
| 2014/0245152 A1* | 8/2014 | Carter | G11B 27/28 715/720 |
| 2015/0009278 A1 | 1/2015 | Modai et al. | |

* cited by examiner

*Primary Examiner* — Girumsew Wendmagegn
(74) *Attorney, Agent, or Firm* — Joseph Petrokaitis, Esq.; McGinn IP Law Group, PLLC

(57) ABSTRACT

A method stored in a computer readable medium, including identifying a predetermined object having viewable information from a plurality of frames, identifying a movement of the predetermined object from a video stream of the plurality of frames, identifying a current state of the predetermined object based on a movement of another object or region from the plurality of frames having an occlusion region of a current frame, determining an information change of the viewable information in the plurality of frames, marking a frame with maximum information of the viewable information in the predetermined object as a key frame; and serializing the key frame according to time stamps.

20 Claims, 12 Drawing Sheets

|  | A | B | C |
|---|---|---|---|
| favorable | 1st | 2nd | 3rd |
| common | 3nd | 2nd | 1st |
| lively | 1st | 2nd | 3rd |
| See the board clearly | 3rd | 2nd | 1st |
| Easy to record | 3rd | 2nd | 1st |
| Feel involved | 1st | 2nd | 3rd |
| Less Record cost | 2nd | 2nd | 1st |
| Less Post pre cost | 1st | 1st | 2nd |

A: video of an offline class  
B: board-type online class  
C: ppt-type online class

FIG. 1

METHOD AND APPARATUS TO EXTRACT KEY VIDEO FRAMES FROM ONLINE EDUCATION

BACKGROUND OF THE INVENTION

Field of the Invention

The disclosed invention relates generally to method and apparatus to extract video frames, and more particularly, but not by way of limitation, relating to extracting key video frames from on-line video.

Description of the Related Art

There has been a rapid increase of online education over the Internet in recent years. Online education is an emerging industry that has a great need to increase the user experience. While there are certain advantages to online education, such as accessibility, there has also been many drawbacks that are problematic for users in current education programs.

Currently, there are programs available with video recording of a classroom that is either available offline for later use or streaming live. Another type is where the educator records the output of a software to present text and drawings. These types of education programs are highly accessible for users, but often cause the user a restricted view of the content or context of the content provided.

For example, users have had issues of receiving the information clearly in the medium presented such as on-line video through a web browser. Educators have recorded programs, but when viewing the programs, the user is unable to clearly discern the context or unable to properly manipulate the video during playback. For example, the boards used to show the content have been difficult to view. The recording can be difficult and expensive for educators and companies. The playback of such videos have been difficult based on the currently available video and playback mechanisms. The educational content need a certain amount of comprehension and so the playback and the recording itself is vital to the communication of the content to the user.

Currently, there is very little effort placed on increasing the user experience. A video is recorded of the content and it is available for viewing on the Internet without any preprocessing to help the user in the viewing.

Therefore, it is desirable to provide an improved version of video that that can have the context such as the blackboard that can be seen clearly, easy to record, a user feeling involved, while reducing recording cost and providing simpler recordings.

SUMMARY OF INVENTION

In view of the foregoing and other problems, disadvantages, and drawbacks of the aforementioned background art, an exemplary aspect of the disclosed invention provides a system and method of failure analysis or simulation.

One aspect of the disclosed invention provides a method stored in a computer readable medium, including identifying a predetermined object having viewable information from a plurality of frames, identifying a movement of the predetermined object from a video stream of the plurality of frames, identifying a current state of the predetermined object based on a movement of another object or region from the plurality of frames having an occlusion region of a current frame, determining an information change of the viewable information in the plurality of frames, marking a frame with maximum information of the viewable information in the predetermined object as a key frame, and serializing the key frame according to time stamps.

The predetermined object can be a blackboard or whiteboard having the viewable information. The key frame can include a blackboard key frame focusing on a blackboard. The identifying of the current predetermined object can include detecting the other object at an area of the predetermined object, cutting a region of the other object out, and searching for a last number of frames from among the plurality of frames. The method can further include cutting a same region without barriers, providing an input of a video recording device parameters of at least two frames, wrapping a previous image to the current frame to recover an object occlusion. The other object can be an instructor in an online video.

Another example aspect of the disclosed invention includes a system including a workstation including a converter, the converter processing an original video to a first video with normal frames and a second video with frames of a predetermined object including viewable information, a video server receiving an upload of the video separately into the first video and the second video, and a client computer, when selecting to view the video at the client computer, the video server sends at least two buffered set of frames including the first video and the second video to the client computer.

The client computer includes a video player and a plugin, and the video player with plugin stores the first and second video that are buffered at the video server. When selecting at the client computer to switch mode, the video player with the plugin switches between the first video and the second video. The second video focuses on a blackboard or a whiteboard and the first video comprises all information recorded. The workstation identifies the predetermined object having viewable information from a plurality of frames. The workstation identifies a movement of the predetermined object from a video stream of the plurality of frames.

The workstation identifies a current state of the predetermined object based on movement of another object or region from the plurality of frames having an occlusion region of the current frame. The workstation determines an information change in the plurality of frames. The workstation marks a frame with maximum information in predetermined object as a key frame. The workstation serializes the key frame according to time stamps Yet another example aspect of the disclosed invention includes a s computer including a computer readable medium storing a program executable by a processor, the processor identifying a predetermined object having viewable information from a plurality of frames, the processor identifying a movement of the predetermined object from a video stream of the plurality of frames, the processor identifying a current state of the predetermined object based on movement of another object or region from the plurality of frames having an occlusion region of the current frame, the processor determining an information change in the plurality of frames, and the processor marking a frame with the maximum information in predetermined region as a key frame. The processor serializes the key frame according to time.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

FIG. 1 shows three common types of on-line education formats.

DETAILED DESCRIPTION OF A PREFERRED EMBODIMENTS

Figure 2:
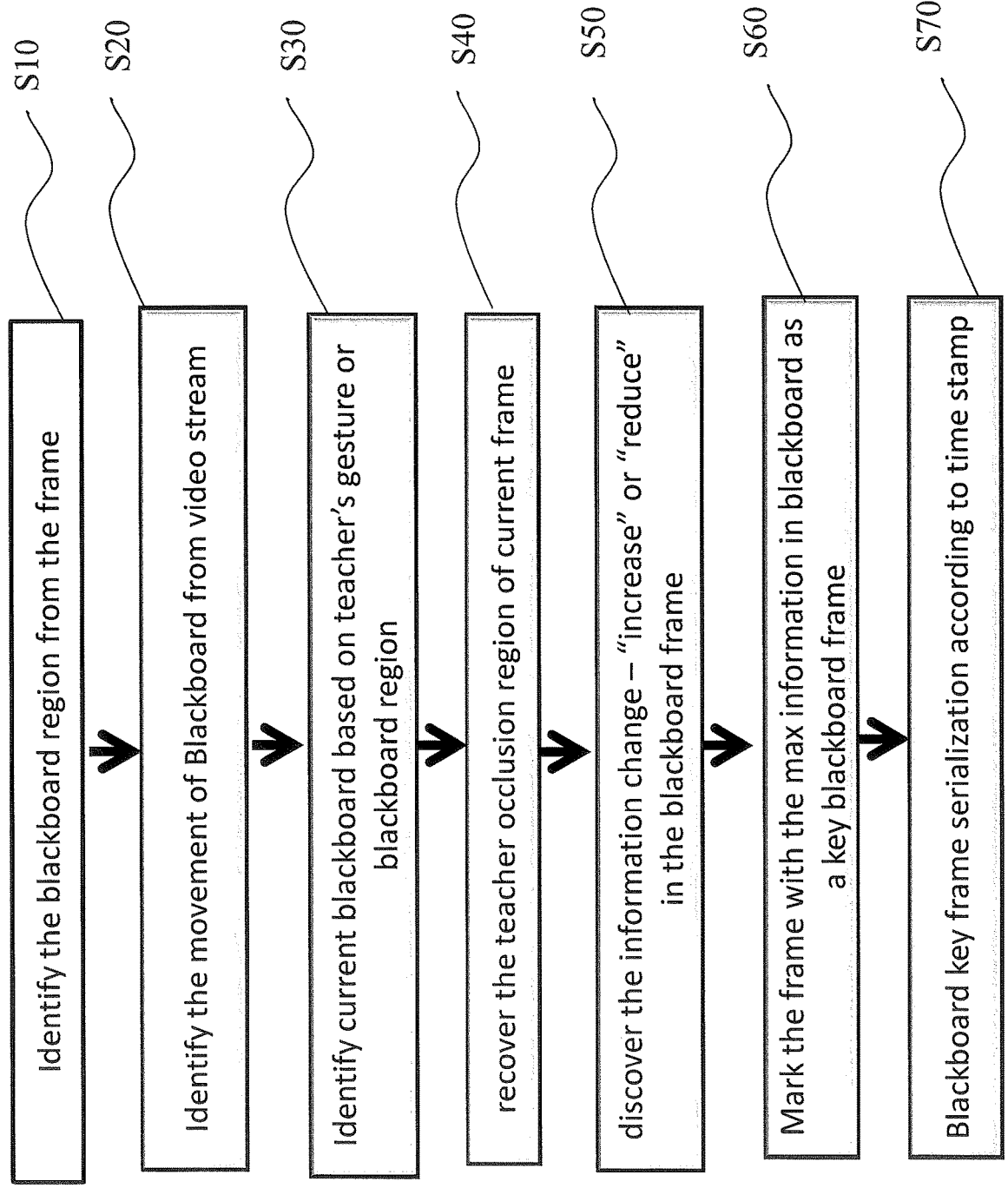
FIG. 2 shows the technique of extracting key video frames according to an example embodiment of the disclosed invention.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

Referring to FIG. 1, a table notes the conclusions for the three of the most popular types of on-line classes with respect to certain criteria that are indicated. An ordinal ranking among the three types (type A to C) are noted for: (a) favorability of types of classes (favorable); (b) least to most common type of online class (common); (c) how lively the interactions are (lively); (d) ease of recording (ease of record); (e) feeling involved by the user (feel involved); (f) least cost of recording (less record cost); and (g) least post and pre-recording cost (Less Post pre cost).

For example, referring again to FIG. 1, there are three types of educational classes shown over the Internet. One type is a video of an offline class (type A), another is a board-type on-line class (type B), and a third is a an educational class utilizing a presentation software (e.g., POWERPOINT, ppt) (type C).

Type A is the favorite and the least common online class type. Therefore, if improvements to these three types of classes can be made, making the recording more simple and in the mean time students could see the board as clearly as type C format, the online education industry may experience huge revolution.

For blackboard occlusion or change by a teacher, it is difficult for students to get the context information, e.g. previous blackboard. Students want to get the context information e.g. previous blackboard. There maybe black occlusion from teacher where the teacher or some other object may block the board. The teacher move to other side of the blackboard, or the teacher may change the black board.

One of the technical problems is how to automatically generate key frames of blackboard. Existing techniques such as "YOUTUBE" can generate the key frames of videos, but its key frames are too many to select and these key frames have no blackboard reference information. Additionally, the thumbnails as reference are too small and difficult to view by users.

The disclosed invention provides a technical solution to extract key blackboard frames of legacy video of online education automatically. In the disclosed invention, a computer can extract key frames of legacy video of online education automatically by identifying blackboards, identify the current blackboard, track the information of blackboard, extract the keys frames of blackboard, and sort the frame by timestamp.

The reference of the blackboard can be changed to some other point or image including the information content. For example, the blackboard could be some other type of whiteboard or frame that includes information including text or drawings for use by the user.

Referring to FIG. 2, some of the key steps include: (step S10) Identify the blackboard region from the frame; (step S20) Identify the movement of Blackboard from video stream; (step S30) Identify current blackboard based on teacher's gesture or blackboard region; (step S40) recover the teacher occlusion region of current frame; (step S50) discover the information change—"increase" or "reduce" in the blackboard frame; (step S60) Mark the frame with the maximum information in blackboard as a key blackboard frame; (step S70) Blackboard key frame serialization according to time stamp.

The steps do not have to be in this particular order as different variations are possible and also some or all of these steps can be processed in parallel or certain steps removed.

In further detail, in step S10, a computer can identify the blackboard region from the frame. Then in step S20, the computer can identify the movement of the blackboard from the video stream.

Figure 3:
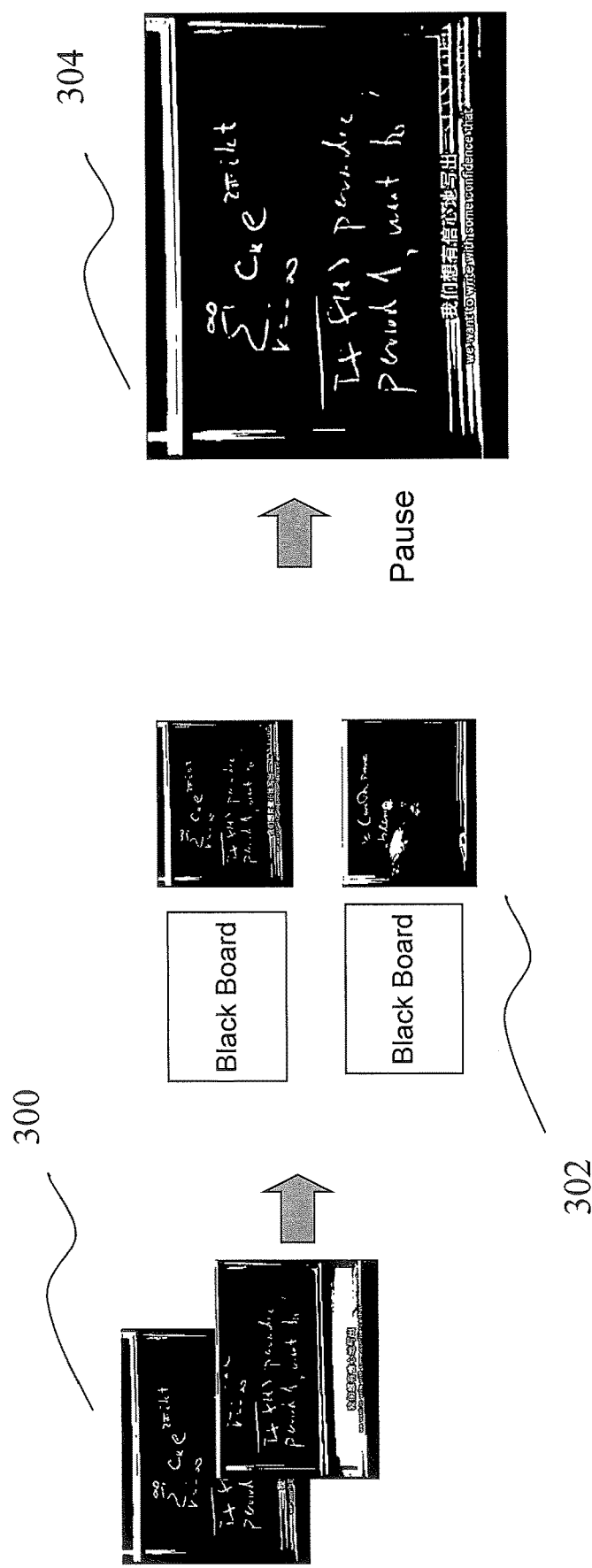
FIG. 3 illustrates the identification of the movement of the blackboard.

Referring to FIG. 3, the frame can be labeled "up" OR "down" OR "left" OR "right" as the reference of current frame. Therefore, in frames 300 to 304, the movement of the blackboard is labeled for step S20.

The labeling of the frames can help provide a new interaction mode (See FIG. 10) about switch is then provided for the viewport of online educations. The view can be switched from up, down, left and right according to the blackboard placement. For example, a user can select in a playback interface, what particular view mode of the backboard or other context such as teacher is needed.

Then the processor of a computer in step S30 can identify current blackboard based on teacher's gesture or blackboard region. The current blackboard is identified through a plurality of methods including obtaining a close-up of the blackboard and map it to the whole view. Additionally, the teacher's gestures can be used including, for example, the teachers hand gestures referring to certain parts of the blackboard or content presented.

Referring to step S50 in FIG. 2, the information content on the blackboard can be labeled as "increase" for when the teacher writes or adds words to the blackboard and "reduce" for when the words or information are cleaned from the blackboard. Therefore, the information change in step S50 is discovered and labeled accordingly to show the change.

Figure 4:
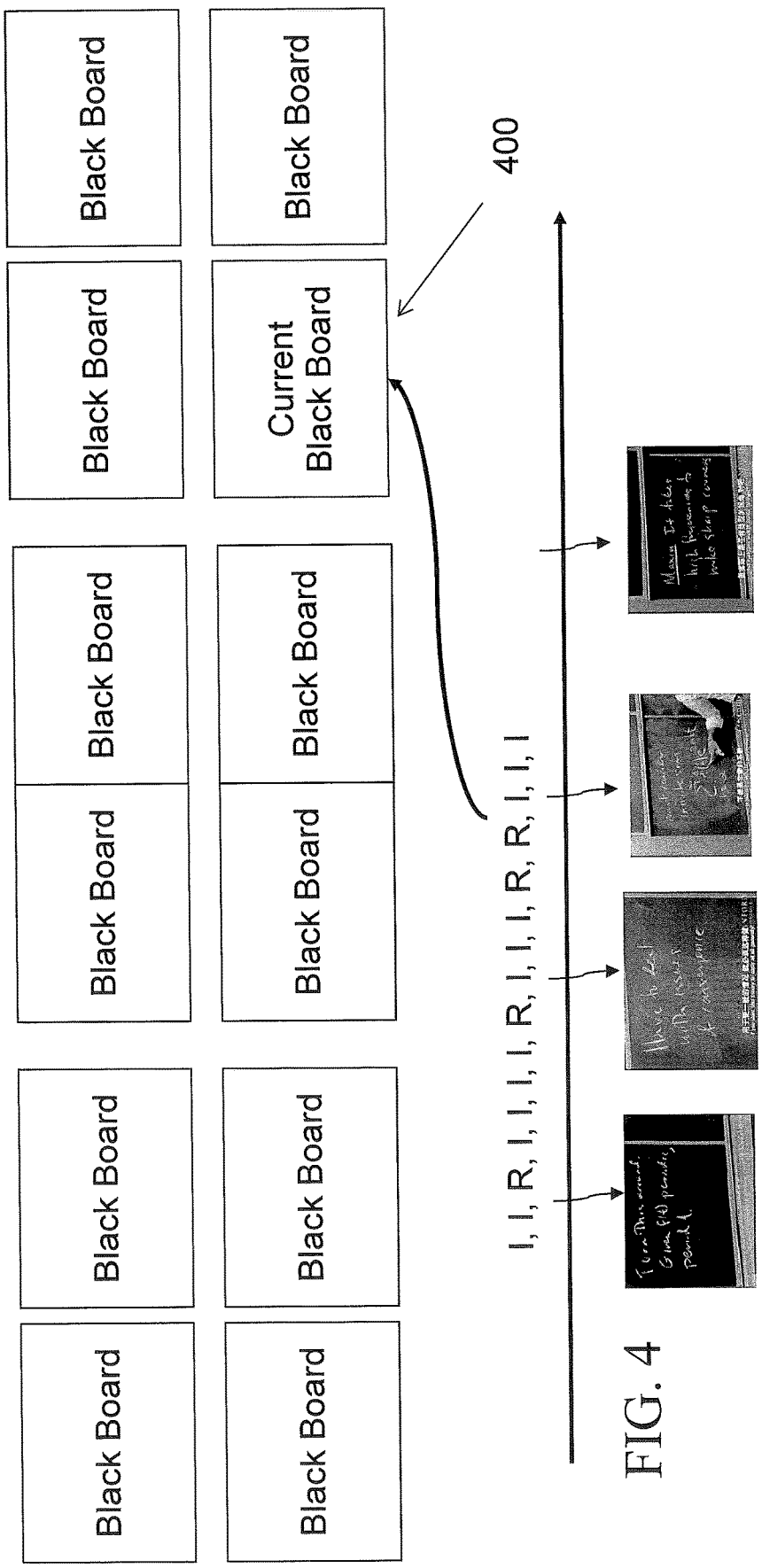
FIG. 4 illustrates a change of the series of information content.

Referring to FIG. 4, a change of the series of information content on the blackboard can be made. The focus on the current blackboard state 400 can be made when key frames are before information decrease or blackboard change as related to Step S30 that identified the current blackboard.

Figure 5:
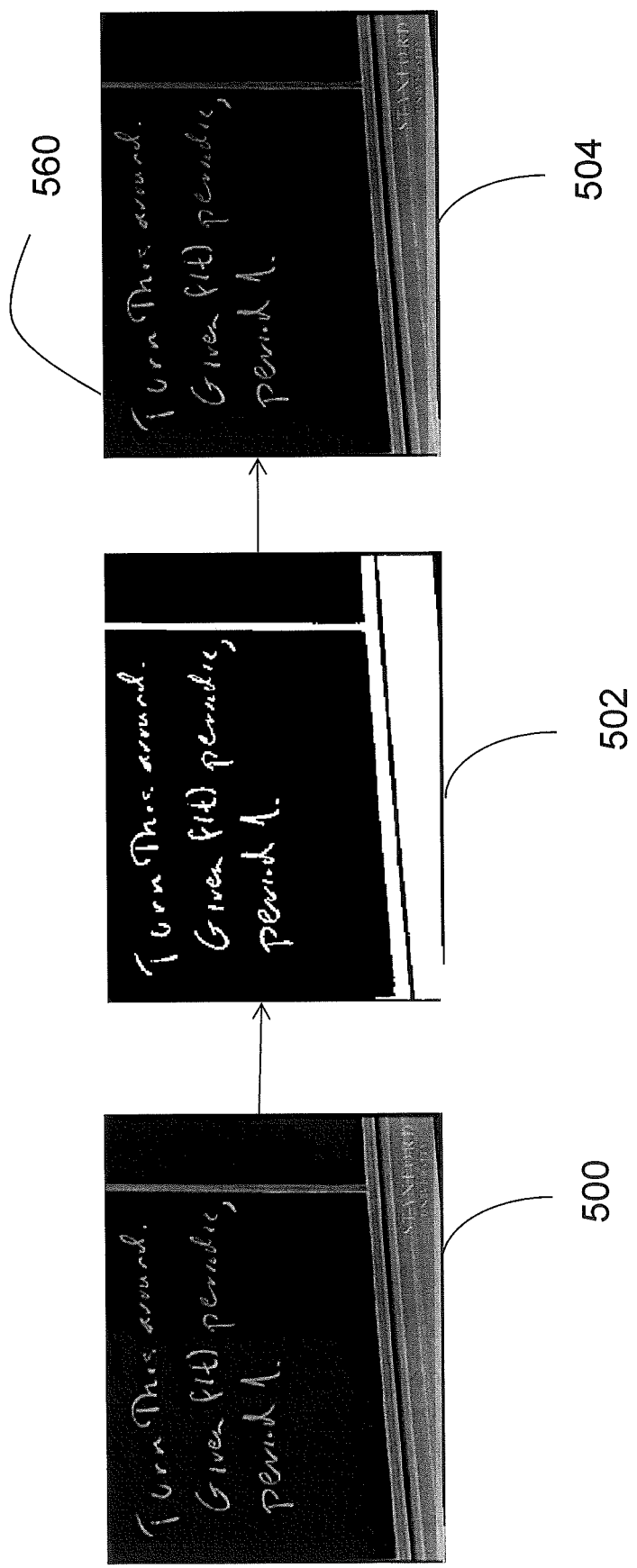
FIG. 5 shows an image process to monitor information change.

Referring to FIG. 5, an image processor (for example in a computer or dedicated image processor) can be used to monitor the backboard change. An image processor can monitor the area change and pixel change, and generate the binary image, while ignoring lines of the blackboard and finds areas where the information is provided as seen in reference 504. Therefore, the initial image 500 can be processed to image 502 to focus in the image 504 with the area focused with information 506.

Therefore, the image processor can be used to identify the movement of the blackboard in step S20, identify the movement of the blackboard in step S30, identify the current blackboard in step S30 and discover the information change in step S50.

Thereafter in step S60, the processor marks the frame with the maximum information in blackboard as a key blackboard frame. Therefore, the key blackboard frames are automatically generated through the identification. Thus the marked information makes it easier later for a user to view certain marked frames according to the maximum information on the blackboard. Other markings can also be made to make it easier later for the user such as a particular information in the blackboard or certain gestures of the teacher.

Figure 6:
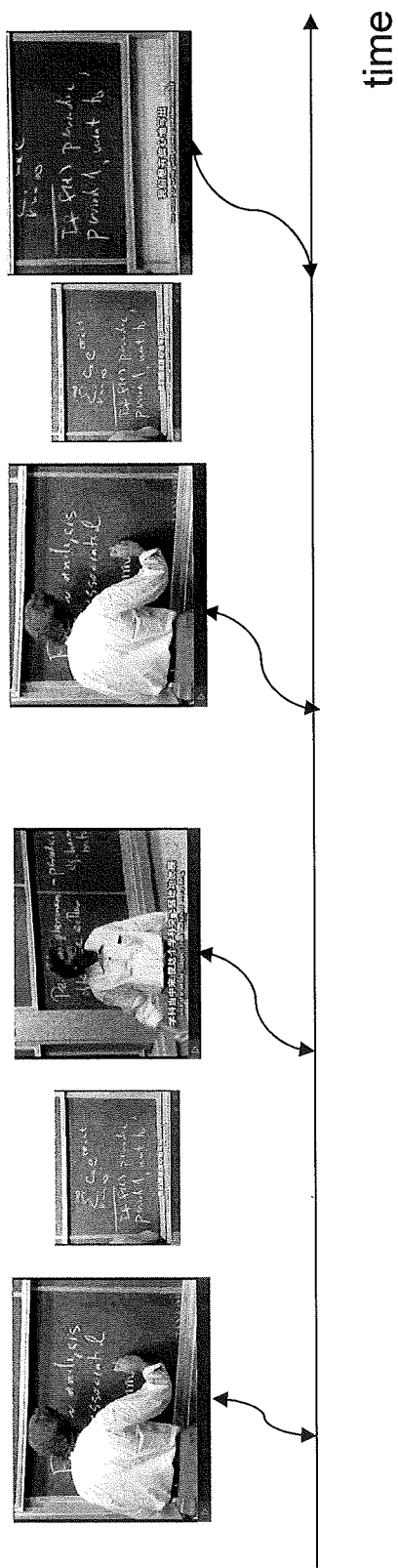
FIG. 6 illustrates an event time stamp.

Referring to FIG. 6, the event time stamp is not in the user interface (UI) framework. As in Step S70, the blackboard key frame marked in step S60 is serialized or sorted according to the time stamp.

Figure 7:
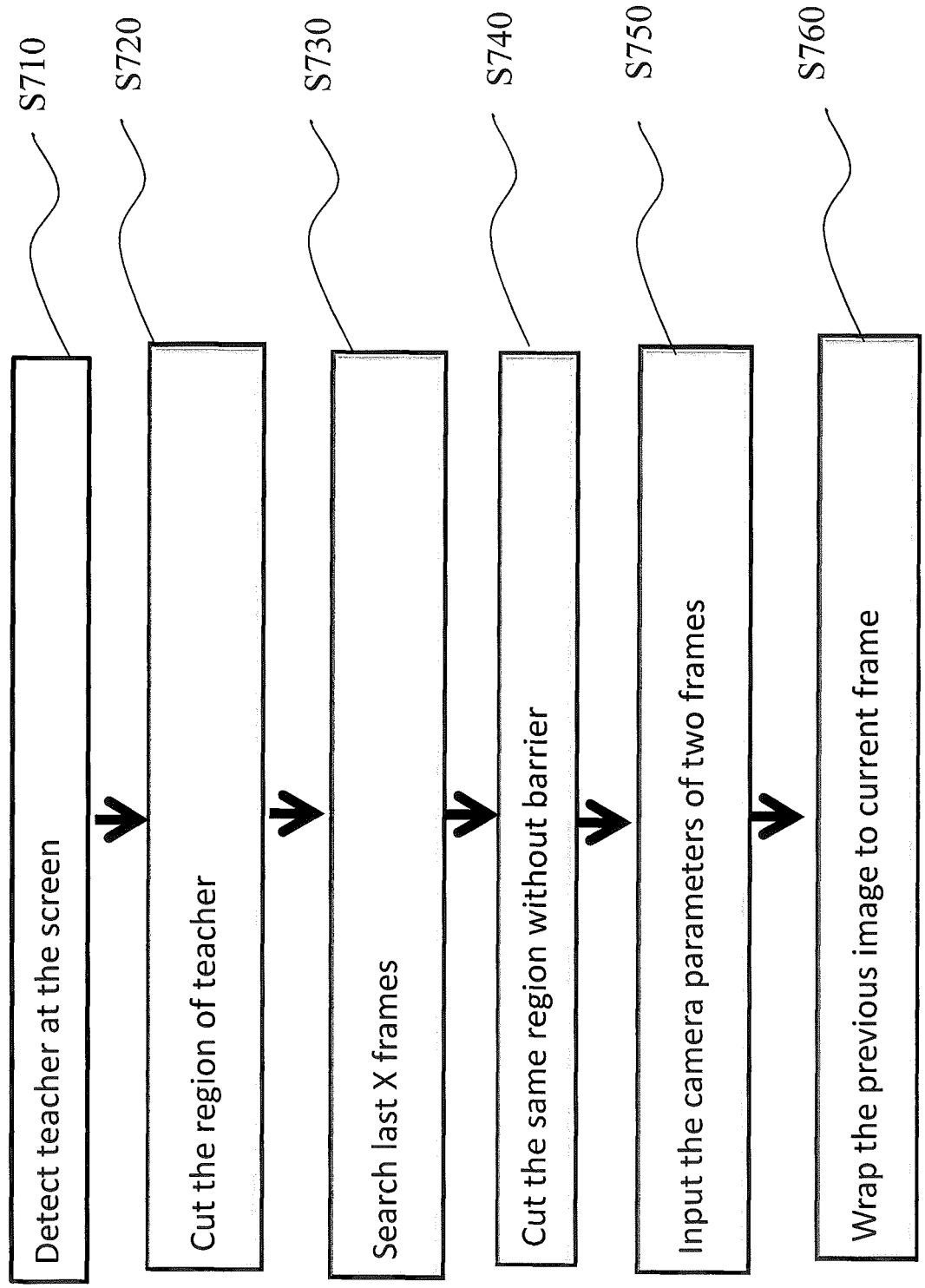
FIG. 7 illustrates a technique to recover teacher occlusion.

Referring to FIG. 7, the method to recover the teacher occlusion is provided as related to step S40. First, a computer detects the teacher at the screen (Step S710), then the processor cuts the region of the teacher out (Step S720). Then in step S730, the computer searches for the last X number of frames (where X is a predetermined integer). Thereafter, the computer cuts the same region without barriers in step S740. Then in step S750, an input of the camera parameters of two frames are provided. Finally, in step S760, the processor wraps the previous image to current frame to recover the teacher occlusion.

Camera calibration and positioning includes the following key algorithms. Parameters of camera model include u,v being image coordinates, and x,y,z being world coordinates.

$$\begin{bmatrix} u \\ v \\ 1 \end{bmatrix} = A[\ R\ \ T\ ] \begin{bmatrix} x_w \\ y_w \\ z_w \\ 1 \end{bmatrix}$$

Intrinsic parameters include A (fixed), focal length, image format, and principal point. Whereas the extrinsic parameters include R,T being the Rotation Translation.

$$A = \begin{bmatrix} \alpha_x & \gamma & u_0 \\ 0 & \alpha_y & v_0 \\ 0 & 0 & 1 \end{bmatrix} T_v = \begin{bmatrix} 1 & 0 & 0 & v_x \\ 0 & 1 & 0 & v_y \\ 0 & 0 & 1 & v_z \\ 0 & 0 & 0 & 1 \end{bmatrix}$$

Then the camera position can be the following:

$$R = \begin{bmatrix} \cos\theta + u_x^2(1-\cos\theta) & u_x u_y(1-\cos\theta) - u_z\sin\theta & u_x u_z(1-\cos\theta) + u_y\sin\theta \\ u_y u_x(1-\cos\theta) + u_z\sin\theta & \cos\theta + u_y^2(1-\cos\theta) & u_y u_z(1-\cos\theta) + u_x\sin\theta \\ u_z u_x(1-\cos\theta) - u_y\sin\theta & u_z u_y(1-\cos\theta) + u_x\sin\theta & \cos\theta + u_z^2(1-\cos\theta) \end{bmatrix}$$

A method of camera calibration includes Direct linear transformation (DLT) method. A classical approach can be the "Roger Y. Tsai Algorithm", or Zhengyou Zhang's "a flexible new technique."

$$C = -R^{-1}T = -R^T T$$

Figure 8:
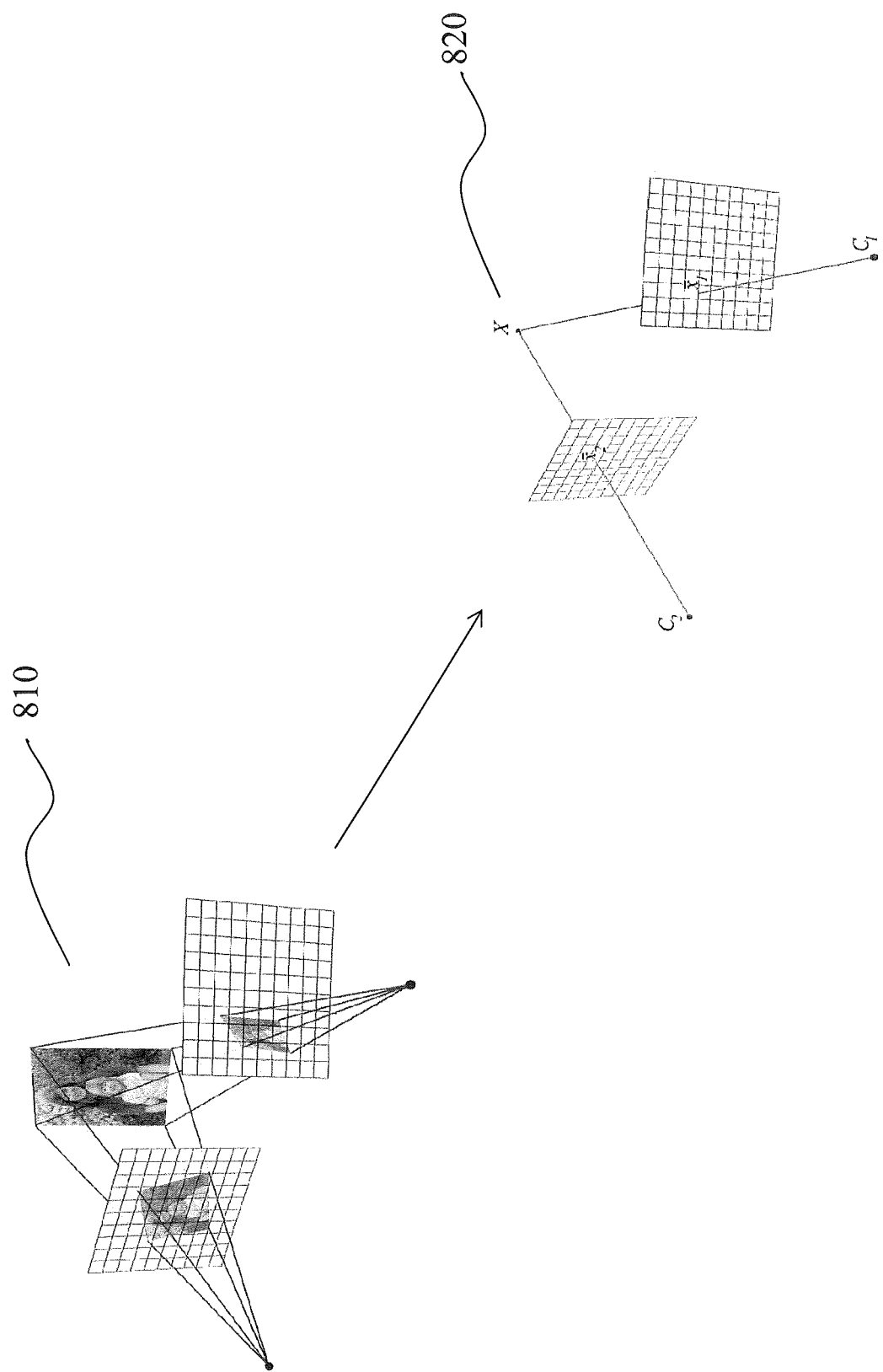
FIG. 8 illustrates a technique of positioning the camera.

Referring to FIG. 8, the position of the camera can include inputting the corresponding points x1 as the pixel of reference image, and x2 is the pixel of realtime image.

$$\begin{bmatrix} u_2 \\ v_2 \\ 1 \end{bmatrix} = A_2[R_2 T_2] \begin{bmatrix} x \\ y \\ z \end{bmatrix} \begin{bmatrix} u_1 \\ v_1 \\ 1 \end{bmatrix} = A_1[R_1 T_1] \begin{bmatrix} x \\ y \\ z \end{bmatrix}$$

$$A_2^{-1}[R_2 T_2]^{-1} \begin{bmatrix} u_2 \\ v_2 \\ 1 \end{bmatrix} = A_1^{-1}[R_1 T_1]^{-1} \begin{bmatrix} u_1 \\ v_1 \\ z \end{bmatrix}$$

Then a processor can obtain a position by calculating $R_2$, $T_2$ (7 parameters)

In a first step, the computer formulates 7 equations from 7 features. Then in a second step, the computer resolves the equations to get $R_2$, $T_2$. Finally, in a third step the computer computes the position of the camera C according to $R_2$, $T_2$.

The 7 equations are formulated by having each feature point to generate an equation, and having each feature line to generate an equation.

$$C = -R^{-1}T = -R^T T$$

As seen in FIG. 8, the translation of the positioning of the camera C can be seen from an image view in 810 and translated points in 820.

Figure 9:
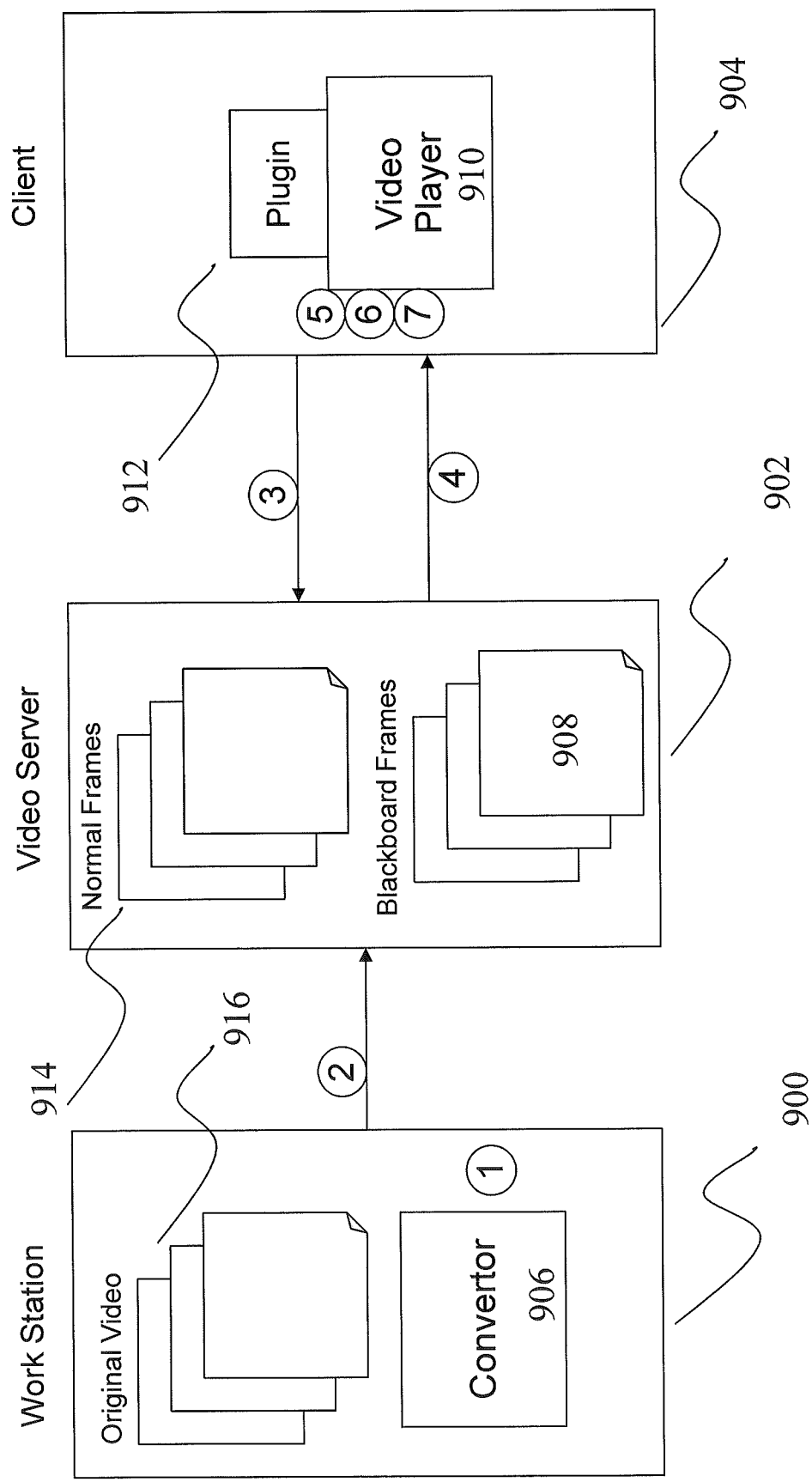
FIG. 9 illustrates the system architecture of the disclosed invention.

Referring to FIG. 9, the architecture of the system is illustrated utilizing the techniques of the disclosed invention. First (1), there is a processing of the original video 916 to the video with normal and blackboard frames with a Convertor 906 at a workstation 900. Then, at path (2), there is an upload of the video to video server 902, where there are the normal frames 914 and the blackboard frames 908. Then at path 3, if a user wants to watch the video from a selection at the client computer 904, the video server 902 at path 4 send two buffered set of frames to the client computer 904 including the normal frames 914 and the separate blackboard frames 908. At point 5, the video player 910 with plugin 912 stores the two buffered video stream frames 908 and 914. Then in step 6, when a user decides to switch the mode. At step 7 the player 910 with plugin 912 can switch the frame buffer between blackboard frames 908 and the normal frames 914.

One of the problems as note previously is the teacher blocking the words on the blackboard. Therefore, information can be lost for the limited number of screens.

Figure 10:
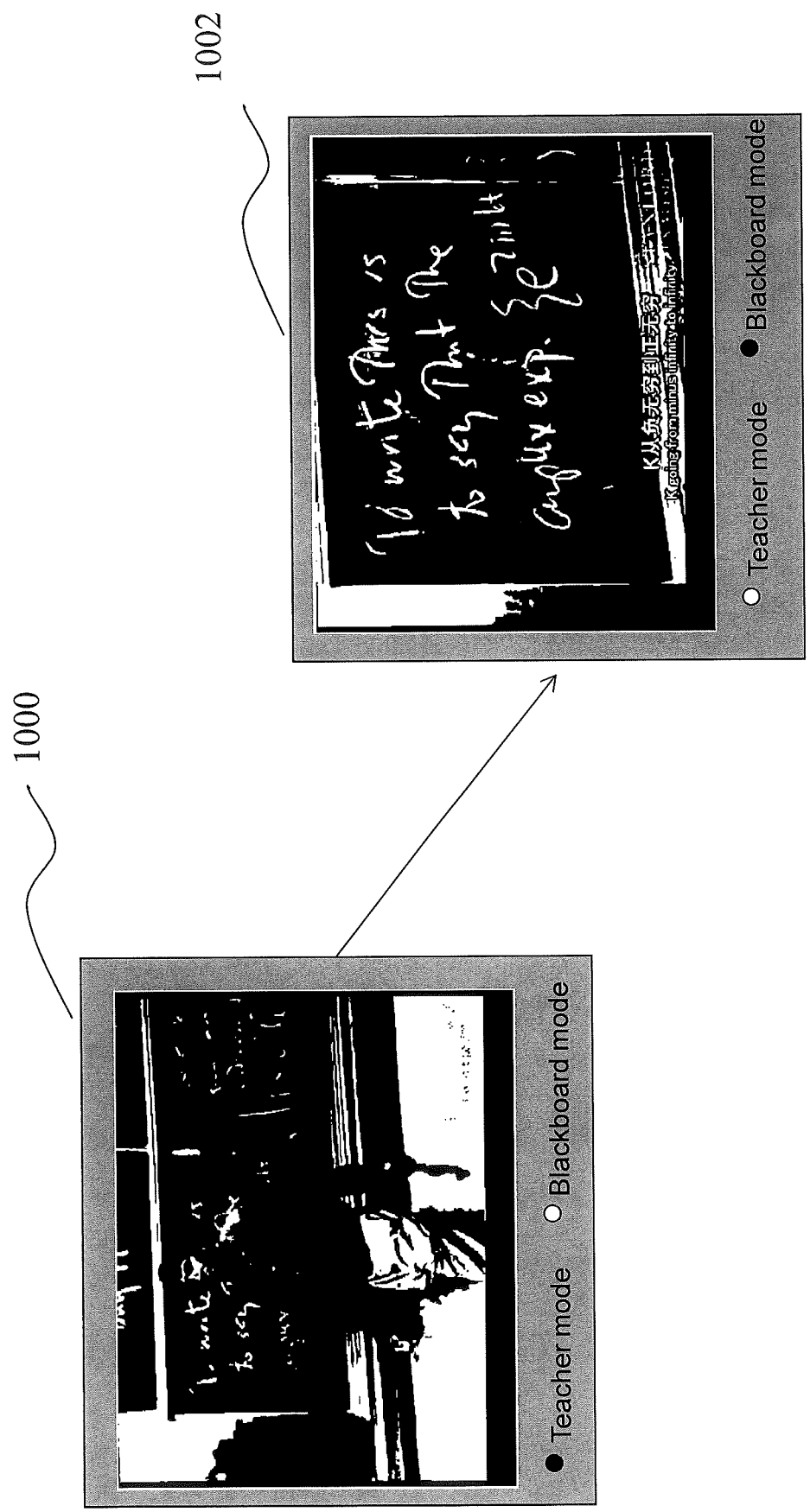
FIG. 10 illustrates the interaction modes of the disclosed invention.

Therefore to take such issues into account, FIG. 10 shows an interaction mode to view online education. For example, there can be at least two modes including a teacher mode 1000 that shows the context of the teacher and a blackboard mode 1002 which hides the teacher and fills in the missing parts. The new interactive mode switches the viewpoint of the online education.

Therefore, based upon the disclosure, some of the key technical contributions are to (a) address the legacy video processing problem in online education, (b) automatically generate blackboard key frames, (c) a new interaction mode about switch viewport of online educations, and (d) a new online education video system for user to navigate the course's context information in blackboard key frames. Therefore, the above shows the techniques including human recognition, line extraction, motion capture, and face recognition, all used together to obtain a more comprehensive viewing of the video by a user.

Exemplary Hardware Implementation

Figure 11:
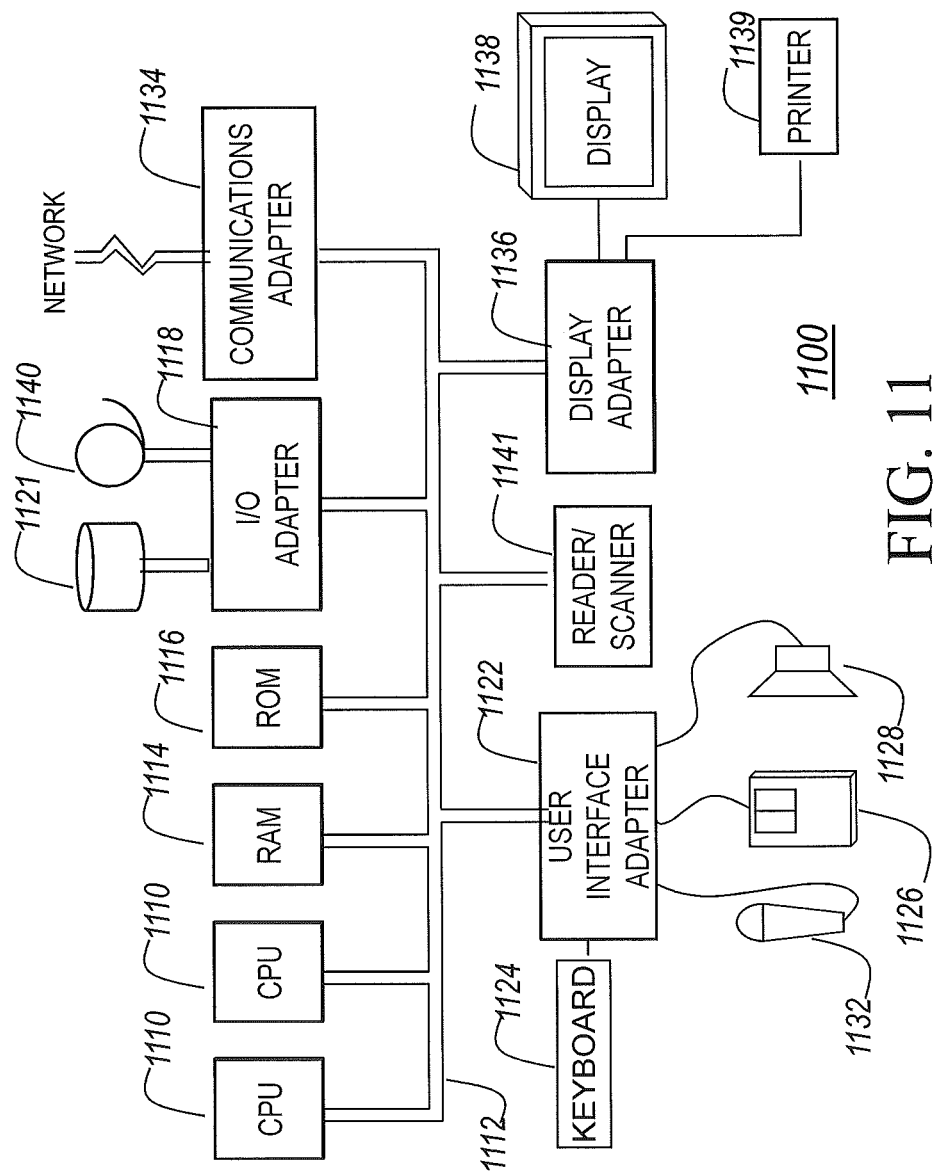
FIG. 11 illustrates an exemplary hardware/information handling system for incorporating the exemplary embodiment of the invention therein.

FIG. 11 illustrates another hardware configuration of an information handling/computer system 1100 in accordance with the disclosed invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Figure 12:
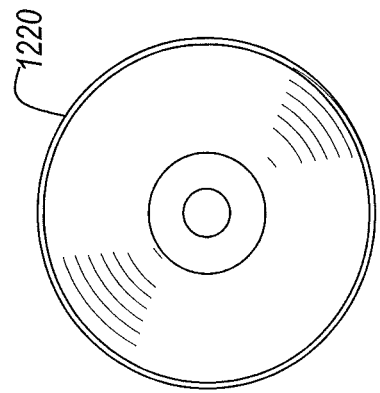
FIG. 12 illustrates a signal-bearing storage medium for storing machine-readable instructions of a program that implements the method according to the exemplary embodiment of the invention.
Figure 12:
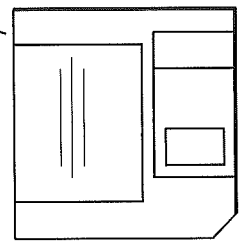

Alternatively, the instructions may be contained in another signal-bearing storage media 1200, such as a magnetic data storage diskette 1210 or optical storage diskette 1220 (FIG. 12), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method stored in a computer readable storage medium, comprising:
    identifying a predetermined object having viewable information from a plurality of frames;
    identifying a movement of the predetermined object from a video stream of the plurality of frames;
    recovering an occlusion region according to information of the predetermined object and
    identifying a current state of the predetermined object based on a movement of another object or region from the plurality of frames having the occlusion region of a current frame.

2. The method according to claim 1, wherein the predetermined object comprises a blackboard or whiteboard having the viewable information, and
    wherein the recovering includes recovering an occlusion region according to information change and the movement of the predetermined object.

3. The method according to claim 1, wherein the identifying of the current state of the predetermined object further comprises:
    detecting the other object at an area of the predetermined object;
    cutting a region of the other object out; and
    searching for a last number of frames from among the plurality of frames.

4. The method according to claim 3, further comprising cutting a same region without barriers.

5. The method according to claim 4, further comprising providing an input of video recording device parameters having at least two frames, and
    wherein identifying a current state of the predetermined object is based on the movement of another object from the plurality of frames having an occlusion region of the current frame.

6. The method according to claim 5, further comprising wrapping a previous image to the current frame to recover an object occlusion.

7. The method according to claim 1, wherein the other object comprises an instructor in an online video,
    wherein the current state of the predetermined object includes the viewable information of the predetermined object at a certain time, and
    wherein the other object or region provides occlusion of information in the frames.

8. The method according to claim 1, further comprising:
    determining an information change of the viewable information in the plurality of frames;

marking a frame with maximum information of the viewable information in the predetermined object as a key frame; and serializing the key frame according to time stamps.

9. The method according to claim 8, wherein the key frame comprises a blackboard key frame focusing on a blackboard.

10. A system, comprising:
a workstation comprising a converter, the converter processing an original video to a first video with normal frames and a second video with frames of a predetermined object including viewable information;
a video server receiving an upload of the video separately into the first video and the second video; and
a client computer, when selecting to view the video at the client computer, the video server sends at least two buffered set of frames including the first video and the second video to the client computer,
wherein the workstation identifies a current state of the predetermined object based on movement of another object or region from the plurality of frames having an occlusion region of the current frame.

11. The system according to claim 10, wherein the client computer includes a video player and a plugin, and
wherein the video player and the plugin stores the first and second videos that are buffered at the video server.

12. The system according to claim 11, wherein when selecting at the client computer to switch a mode, the video player with the plugin switches between the first video and the second video.

13. The system according to claim 11, wherein the second video focuses on a blackboard or a whiteboard and the first video comprises all information recorded.

14. The system according to claim 11, wherein the workstation identifies the predetermined object having viewable information from a plurality of frames.

15. The system according to claim 14, wherein the workstation identifies a movement of the predetermined object from a video stream of the plurality of frames.

16. The system according to claim 15, wherein the workstation determines an information change in the plurality of frames.

17. The system according to claim 16, wherein the workstation marks a frame with maximum information in the predetermined object as a key frame.

18. The system according to claim 17, wherein the workstation serializes the key frame according to time stamps.

19. A computer comprising:
a computer readable medium storing a program executable by a processor;
the processor identifying a predetermined object having viewable information from a plurality of frames;
the processor identifying a movement of the predetermined object from a video stream of the plurality of frames;
the processor identifying a current state of the predetermined object based on movement of another object or region from the plurality of frames having an occlusion region of the current frame;
the processor determining an information change in the plurality of frames; and
the processor marking a frame with the maximum information in predetermined object as a key frame.

20. The computer according to claim 19, wherein the processor sorts the key frame according to time.

* * * * *